March 8, 1927.

B. McCLELLAND 1,620,482

PRESSURE GAUGE

Filed Nov. 18, 1921

INVENTOR
Bert McClelland
BY
Parker W. Page
ATTORNEY.

Patented Mar. 8, 1927.

1,620,482

UNITED STATES PATENT OFFICE.

BERT McCLELLAND, OF SELLERSVILLE, PENNSYLVANIA, ASSIGNOR TO UNITED STATES GAUGE COMPANY, OF NEW YORK, N. Y., A CORPORATION OF PENNSYLVANIA.

PRESSURE GAUGE.

Application filed November 18, 1921. Serial No. 516,012.

In certain forms of pressure gauge it is desirable to employ some means, responsive to pressure, that will impart to the pointer that indicates the pressures on the dial, an amplified movement for a given range of low pressures and a more restricted movement for variations in the pressures above such range. Such means are known in the art as retarders, and they are of widely varying character.

The invention which forms the subject of this application is an improvement in gauges of this nature, and resides in the special means which I have devised for accomplishing the desired result. In general terms, the improved means comprises any suitable form of connection in the nature of a link pivoted to the end of the Bourdon tube and having with reference to a fixed support a limited range of movement which does not interfere in any way with the free movement of the tube under the influence of relatively low internal pressure but which, at the limit of such movement when a predetermined pressure is reached acts to change the normal path of travel of the otherwise free end of the tube, causing the latter to move through much shorter spaces in obedience to increments or decrements in pressure, and thus impart to the pointer through the usual means greatly restricted movements in indicating all variations of pressure above a certain limit which is predetermined by the adjustment of the parts.

This improvement is indicated in the accompanying drawing, in which.

Figure 1:
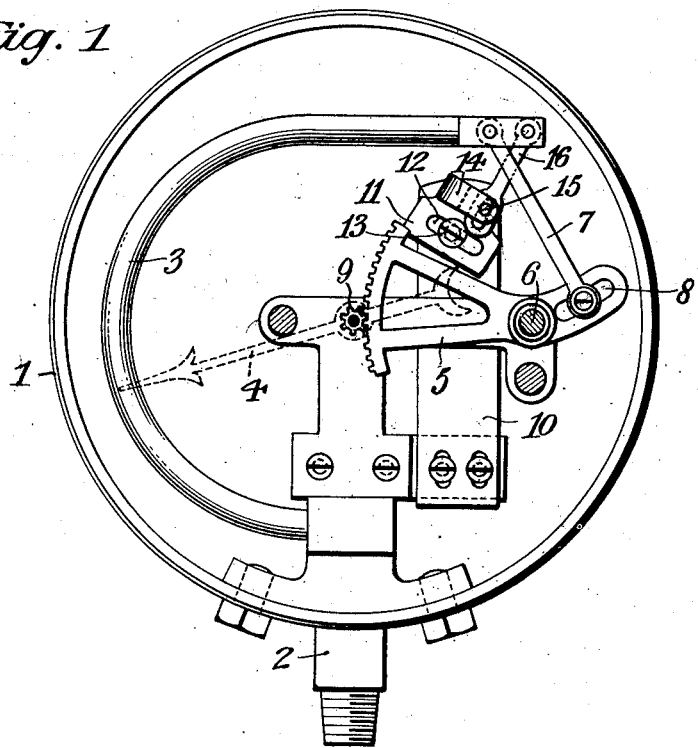
Fig. 1 is a view in elevation of the interior of a gauge of well known construction to which the improvement is applied.
Figure 2:
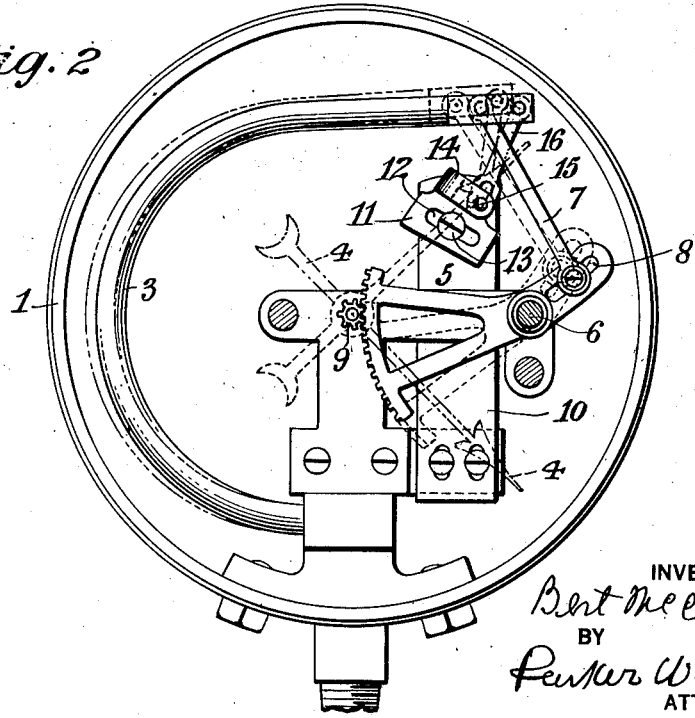
Fig. 2 is a similar view of the gauge indicating the parts in different positions.

The gauge shown is typical of any instrument of this nature to which the invention is applicable, single or compound. It comprises the usual casing 1, a socket 2 with a threaded end for attachment to a pressure pipe or other apparatus, a Bourdon tube or spring 3 set in the socket and communicating with the pressure pipe or chamber, and a pointer 4 for indicating the pressure. The movement of the free end of the tube 3 under the influence of pressure and when the gauge is in its normal position, is both horizontal and vertical with respect to the pivotal point of the pointer, and this movement is imparted to a sector 5 pivoted at 6 by means of a link 7 pivoted near the solid end of the spring and adjustably secured at its other end in a slot 8 in the sector. The latter is provided with gear teeth that mesh with a toothed pinion 9 on the pointer.

To the socket 2 is secured by screws and preferably so as to be capable of vertical adjustment thereon a plate 10 and to this plate a smaller plate 11, with a slot 12, is adjustably secured by means of a set screw 13. The plate 11 carries a bent-over arm 14 to afford a bearing for a pin 15 set therein and also in the plate 10, and a short link 16 with a slotted end which is pivoted to the solid end of the spring 3, works over this pin 15, as shown.

In practically all retard movements heretofore known there is no adequate provision for adjustment. In other words, it has been necessary to use a dial suited to the movement or a movement suited to the dial as adjustment of the gauge after once being made is not possible or feasible. With the instrument constructed as above described, however, the retard movement is of such a nature that the retard may be adjusted within very wide limits by merely varying the angle of the slotted link with respect to the point of its connection with the tube. For example, the parts are so related and combined that the spring or tube 3 moves freely under all pressures up to a certain limit which may be assumed to be 10 pounds. By this means the pointer is turned to indicate such pressures over a very large part of the dial, but when this limiting pressure is reached the link 16 will be moved to a point where its further movement is checked by the pin 15, whereupon the normal path of travel of the end of the tube is changed and under the forces then acting upon it will have a restricted movement under higher pressures which is the component of these forces, and will therefore impart a correspondingly smaller or retarded movement to the sector 5.

Low pressures will therefore be plainly indicated by wide variations in the movement of the pointer but higher pressures will result in much reduced movements as will be understood.

This device is a substantial improvement on the means heretofore employed for this purpose. It is easily and cheaply made and applied. It is not liable to get out of order and requires no care or attention, once the proper adjustments are made.

The invention is obviously applicable to vacuum as well as pressure gauges and the character of the extensible connection between a fixed support and the tube may be very widely varied without departure from the invention.

What I claim as my invention is:

1. In a pressure gauge, the combination with a pointer, a Bourdon tube and intermediate means for imparting to the pointer movements corresponding to all of those of the tube under the influence of varying pressures, of a freely swinging link pivoted to the end of the Bourdon tube, and a fixed stop, said link being constructed for such engagement with said stop as to be capable of having a free movement of limited extent with relation to said stop which arrests the normal movement of the link and the tube at the end of such limited movement, whereby a further increase of pressure imparts to the tube at the pivotal point of the link, a movement in an arc of which the fixed stop is the center.

2. In a pressure gauge, the combination with a pointer, a pivoted sector operatively connected therewith, a Bourdon tube, the free end of which in the normal position of the instrument is free to move horizontally and vertically, and means for imparting movements therefrom to the sector, of an independent connection with lost motion between the end of said tube and a fixed support which permits of a free vertical movement of limited extent to the end of said tube away from said fixed support, whereby such vertical movement is arrested at a predetermined pressure and changed to one that imparts to the pointer a lesser movement for variations of pressure after such predetermined pressure has been reached.

3. In a pressure gauge, the combination with a pointer, a pivoted sector operatively connected therewith, a Bourdon tube and means for imparting the movements of the end of such tube under varying pressures to the sector, of a link pivoted to the end of the tube having a slot therein, and a pin set in a fixed support over which the slotted link works with a limited range of movement.

4. In a pressure gauge, the combination with a pointer, a pivoted sector operatively connected therewith, a Bourdon tube and means for imparting the movements of the end of such tube under varying pressures to the sector, of a slotted link pivoted to the end of the tube, an adjustably fixed support and a pin carried thereby over which the slotted link works with a limited range of movement.

5. In a pressure gauge, the combination with a pointer, means including a pivoted sector for operating the pointer, a Bourdon tube and means for imparting the movements of the end of such tube under varying pressures to the sector, of a link pivoted to the end of the tube having a slot therein, and a pin set in a normally fixed support, said pin extending into the slot of the link whereby the path of movement of the tube is affected.

6. In a pressure gauge, the combination with a pointer, means including a pivoted sector for operating said pointer, a Bourdon tube and means for imparting the movements of the end of such tube under varying pressures to the sector, of a slotted link pivoted to the end of the tube, an adjustably fixed support and a pin carried thereby and extending into the slot of the link whereby the range of the movement of the pointer is affected.

In testimony whereof I hereto affix my signature.

BERT McCLELLAND.